United States Patent Office 3,290,054
Patented Dec. 6, 1966

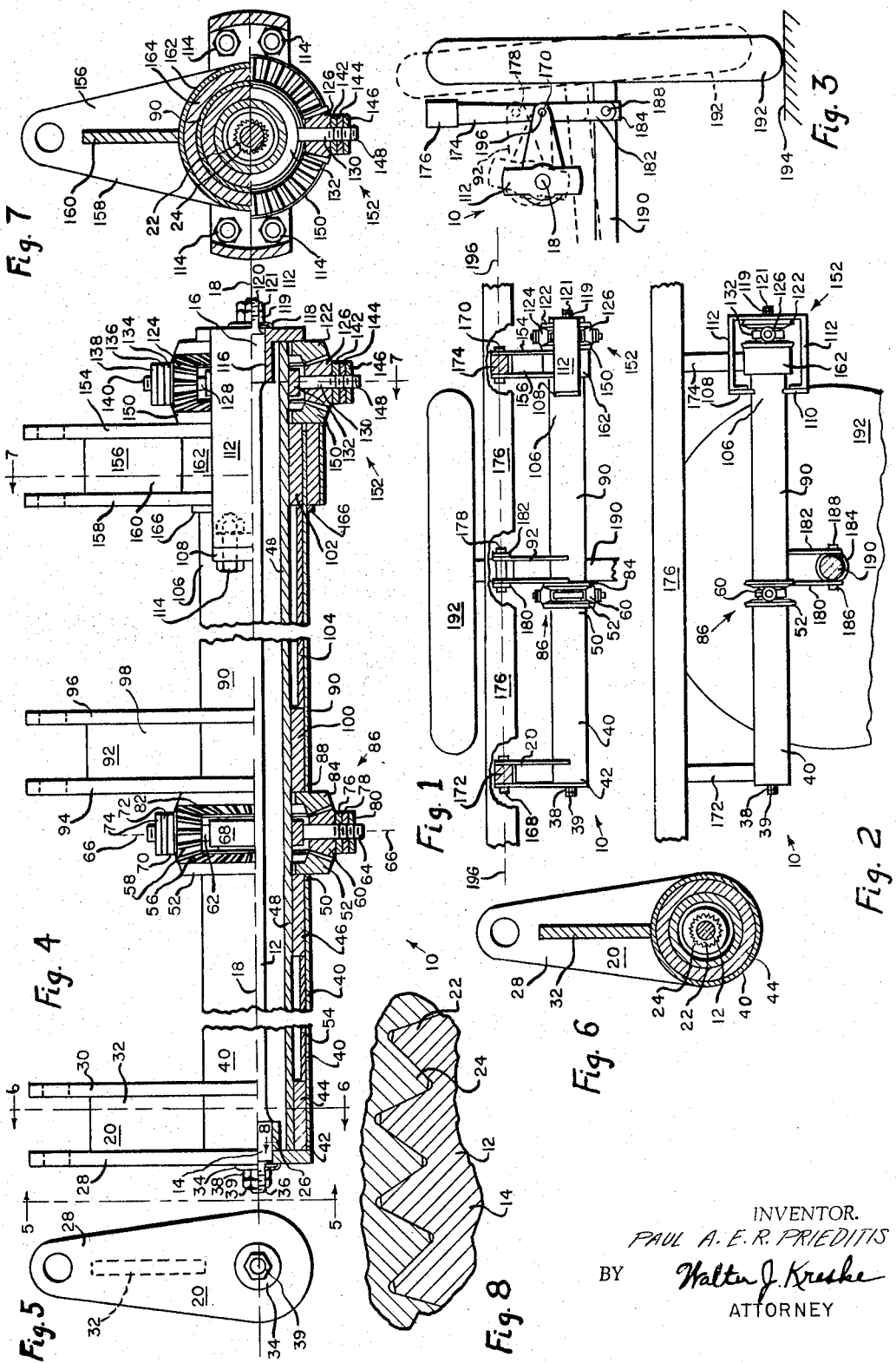

3,290,054
VEHICLE SUSPENSION
Paul Alexander Emil Reinis Prieditis, 86 Sagamore Ave., Winthrop, Mass.
Filed July 27, 1964, Ser. No. 385,374
3 Claims. (Cl. 280—106.5)

This application is a continuation-in-part of application Serial Number 217,953 filed August 20, 1962, now abandoned.

This invention relates to vehicle suspensions and more particularly to an improved wheel vehicle suspension which substantially prevents sudden vertical forces on the wheels of the vehicle, such as from irregularities in the road or track on which the wheel moves from changing the path of travel of the body support and thereby the body of the vehicle.

An important problem in ground travel comfort, convenience and speed of travel of wheel vehicles such as automobiles, trailers, trucks and trains has been that of the jolting and jarring of the body of the vehicle transmitted thereto through the wheels due to vertical impact loading on the wheels from bumps, holes and other irregularities in the road or track on which the vehicle is traveling. The existing arrangements of air, leaf, coil and torsional spring suspensions between the body and wheels, while helpful in softening the ride, nevertheless, still result in substantial uneveness of motion of the vehicle body due to such terrain irregularities.

This problem has been substantially overcome by the present invention of a vehicle suspension which also incorporates other desirable features and advantages. Among these other desirable features and advantages of the present invention are a vehicle suspension which inherently compensates within itself for sudden vertical movement of a vehicle's wheel, such as caused by bumps and depressions in the path of the wheel, to maintain the path of travel of the body support structure and thereby the vehicle body unchanged. Another advantage is that of substantially reducing reactive forces on the vehicle axles, frame and body cause by sudden vertical wheel movements from such terrain irregularities. A further advantage is that of a suspension adaptable to individual wheels of the vehicle independently of other wheels of the vehicle. Further advantages include inherent ruggedness of structure, adaptability to light and heavy vehicles and reliability of operation with a long useful life.

A primary object of the present invention is the provision of a vehicle suspension which substantially prevents sudden vertical forces on the wheels of the vehicle, such as those due to bumps and depressions in the terrain, from being transmitted to the body support and thereby the body of the vehicle.

Another object is the provision of a vehicle suspension which inherently compensates for sudden upwardly or downwardly movements of the vehicle wheels in manner to maintain the vehicle body support structure and thereby the body on an even path substantially unaffected by such sudden irregularity of movement of the wheels.

Further objects include the provision of a vehicle suspension which is readily adaptable to individual wheels, to both heavy and light weight vehicles, is extremely compact and rugged in construction, reliable in operation, and has a long operating life.

These objects, features and advantages are achieved generally by providing an elongated torsional spring member having two ends and a longitudinal axis, a body support lever coupled to one end of the torsional spring member for transmitting weight from the body of a vehicle as a torque or moment of force in one direction about the axis at the one end of the torsional spring member, a second lever coupled to the other end of the torsional spring member for transmitting vertical forces from a wheel as a torque or moment of force in the opposite direction about the axis at the other end of the torsional spring member, and a motion reversing structure coupled to both of said levers in manner to cause one of the levers to rotate about said axis in one direction in response to rotation of the other lever in an opposite direction about said axis.

By providing a third lever along said axis equally spaced from the opposing side of the second lever as that of the spacing between the first and second levers, and providing a similar motion reversing structure coupled to the second and third levers to cause the third lever to move in the same direction about said axis as the first lever in response to opposite direction movement of the second lever, a desirably proper balance of body and wheel loading on the suspension is thereby achieved.

By providing a planetary bevel gear train as the motion reversing structure with a rigid hollow tube about the torsional spring member for holding the planetary gears of the gear train in fixed position on the rigid hollow tube, and providing a pair of rotary motion transmitting tubes rotatably mounted on the rigid hollow tube with one of the rotary motion transmitting tubes coupling the respective levers to the motion reversing bevel gear train, a very compact and rugged structural arrangement of the suspension is thereby achieved.

These and other features, objects and advantages of the invention will be better understood from the following description taken in connection with the accompanying drawings of a preferred embodiment of the invention and wherein:

FIG. 1 is a plan view illustrating the invention attached in operating relation to a wheel and a body support member with the body support member cut away at several places to more clearly show construction of the suspension;

FIG. 2 is an elevational view taken of the FIG. 1 embodiment as seen from below FIG. 1;

FIG. 3 is an end view looking at the embodiment in FIG. 2 from the right hand side of FIG. 2;

FIG. 4 is a partially cut away plan view to enlarged scale of the suspension assembly alone to more clearly show construction;

FIG. 5 is an end view taken on line 5—5 of FIG. 4;

FIG. 6 is a sectional view taken on line 6—6 of FIG. 4;

FIG. 7 is a sectional view taken on line 7—7 of FIG. 4;

FIG. 8 is a segmentary view taken on line 8 of FIG 4 to show a suitable torsion member coupling structure.

Referring to the drawings in more detail, a preferred embodiment of a vehicle suspension constructed in accordance with the present invention is designated generally by the numeral 10 (FIGS. 1, 2, 3, and 4). The vehicle suspension 10 has an elongated torsion spring member 12 having two ends 14 and 16 (FIG. 4) and a longitudinal axis 18. While in the present instance for illustrative purposes the torsion spring member 12 is shown as an elongated circular bar preferably of an elastic material such as spring tempered steel, in some instances, as for increased rotational displacement capability, its may be desirable that the torsion spring member 12 be in the form of flat spring elements combined to form an elongated bundle, or even a coil spring for increased sensitivity to torque.

Then end 14 of the torsion spring member 12 is coupled to a lever 20 in manner such that rotational movement of the lever 20 about the longitudinal axis 18 will cause integral rotational movement of the elongated torsion spring member end 14 about the axis 18. A suitable structure for achieving such integral rotational movement is illustrated in FIG. 8 which is to enlarged scale of a section on line 8 of FIG. 4 and wherein the end 14 of the elongated torsion spring member 12 has tooth formations or splines 22 engaging similar tooth formations or splines 24 in a hub 26 which is an integral part of the lever 20. Thereby, the elongated torsion spring member 12 may move axially as required by changes in its length from torsional or other forces, but is constrained to rotate integrally about the axis 18 with the lever 20.

For strength and rigidity, the lever 20 is preferably comprised of two broad platular sections 28 and 30 rigidly fixed in place by a webb-like section 32. The platular section 28 of the lever 20 fits against a convex spring washer 34 carried by a threaded stem 36 extending axially from the end 14 of the torsion spring member 12 and on which are screwed a nut 38 and lock nut 39 which limits axial movement of the elongated torsion spring member 12 with respect to lever 20.

The lever 20 is rigidly fastened to one end 42 of a rotary motion transmitting tube 40 as by welding or other suitable fastening means. The rotary motion transmitting tube 40 is mounted by bearings 44 and 46 to rotate about a rigid reference tube 48 circumscribing the elongated torsion spring member 12 and having substantially the same axis 18. The rotary motion transmitting tube 40 has its other end 50 rigidly fixed to a bevel gear 52 as by welding or other suitable fastening means. The bearings 44 and 46 may be sleeve, roller or ball bearings as desired and may be retained in place against the platular section 28 and the bevel gear 52 by a spacer sleeve 54 within the rotary motion transmitting tube 40.

Gear teeth 54 of the bevel gear 52 engage bevel gear pinions 58 and 60 mounted to rotate on spindles 62 and 64 respectively about an axis 66 at right angles to the axis 18. The spindles 62 and 64 are held in place by a frame 68, herein sometimes referred to as a spider, rigidly fixed to the reference tube 48. The pinion 58 is held in place on spindle 62 by a thrust bearing 70, a nut 72 and lock nut 74 on the threaded end of the spindle 64. The pinion 60 is similarly held in place on the spindle 64 by a thrust bearing 76, a nut 78 and a lock nut 80.

The pinions 58 and 60 engage gear teeth 82 of a second bevel gear 84 similar to the bevel gear 52 to form with the pinions 58 and 60 and bevel gear 52 a positive rotary motion reversing gear system 86.

The bevel gear 84 is rigidly fixed to one end 88 of a second rotary motion transmitting tube 90 similar to the above mentioned rotary motion transmitting tube 40. The end 88 of the rotary motion transmitting tube 90 also carries rigidly fixed thereto a wheel suspension lever 92 which, as in the body support lever 20, is comprised of broad platular sections 94 and 96 fixed to a web-like section 98. Platular section 94 is rigidly fixed to the back of the bevel gear 84 as well as to the rotary motion transmitting tube 90 by welding or other suitable fastening means, so as to rotate integrally with the rotary motion transmitting tube 90 and the bevel gear 84 about the axis 18 on bearings 100 and 102 respectively. The bearings 100 and 102 may be similar to bearings 44 and 46 and are held in place on the reference tube 48 by a spacer sleeve 104.

The other end 106 of the rotary motion transmitting tube 90 carries brackets 108 and 110 (FIGS. 2, 4 and 7) to which a yoke 112 is rigidly fastened by bolts 114. The yoke 112 has a hub 116 (FIG. 4) with lateral tooth formations similar to the tooth formations 24 in FIG. 8 which engage tooth formations similar to the tooth formations 22 in FIG. 8 on the end 16 of the elongated torsion spring member 12 for integral rotary movement of the end 16, rotary motion transmitting tube 90 and bevel gear 84 about the axis 18.

The end of yoke 112 fits against a convex spring washer 118 similar to the washer 34 on an axially extending threaded stem 120 of the torsion spring member 12, similar to the stem 36, and carrying a nut 119 and lock nut 121 to restrict axial movement of the elongated torsion spring member 12 with respect to yoke 112. Thereby, rotary movement of the bevel gear 84, lever 92, rotary motion transmitting tube 90 and the end 16 of the elongated torsion spring member 12 will be integral in the same direction. Also, because of the motion reversing bevel gear system 86, the rotary movement will be equal and opposite to that of the bevel gear 52, rotary motion transmitting tube 40, the body support lever 20 and the end 14 of the elongated torsion spring member 12. It will thereby be noted that rotary movement of lever 92 with respect to lever 20 will cause an equal and opposite rotary movement at the ends 14 and 16 of the elongated torsion spring member 12 and thereby cause a torque or moment of force in the elongated torsion spring member 12.

The yoke 112 also has rigidly fixed thereto a bevel gear 122, which may be similar to the bevel gears 84 and 52, for integral motion with yoke 112, rotary motion transmitting tube 90, wheel suspension lever 92 and bevel gear 84. A pair of bevel gear pinions 124 and 126, similar to the pinions 58 and 60, are carried on spindles 128 and 130, similar to the spindles 62 and 64, fixed to a frame or spider 132, similar to the frame 68, and similarly fastened to the reference tube 48. The pinion 124 is held in place on spindle 128 by a thrust bearing 134, a nut 136 and a lock nut 138 on threaded end 140 of the spindle 130. The pinion 126 is held in place on spindle 130 by a thrust bearing 142, a nut 144 and a lock nut 146 on threaded end 148 of the spindle 130.

Pinions 124 and 126 engage another bevel gear 150 similar to the bevel gear 122 forming a second positive rotary motion reversing gear system 152 similar to the positive rotary motion reversing gear system 86.

Bevel gear 150 is rigidly fastened to a broad platular section 154 of a second body supporting lever 156. The body supporting lever 156 also has a platular section 158 and a web-like connecting structure 160 similar to that of the wheel suspension lever 92 except in that the body support lever 156 has a bearing housing 162 carrying therein a bearing 164 on the rotary motion transmitting tube 90 so as to permit the body support lever 156 to rotate about the axis 18 in opposite relation to the rotary motion transmitting tube 90. The bearing 164 may be held in place against the bevel gear 132 by a retainer ring 166 to the rotary motion transmitting tube 90.

Thus the body support lever 156 will by virtue of the positive rotary motion reversing gear system 152 rotate about axis 18 in an opposite direction to that of the wheel support lever 92 and in the same direction as that of body support lever 20.

Referring to FIGS. 1, 2 and 3 in more detail, the motor vehicle suspension 10 has its body supporting levers 20 and 156 coupled through pivot pins 168 and 170 to body support brackets 172 and 174 respectively. The other ends of the body support brackets 172 and 174 are fixed in support relation to a body support beam or frame member 176 on which the body (not shown) of the motor vehicle is carried.

The wheel suspension lever 92 is fastened by pivot pin 178, linkage arms 180 and 182, and yoke 184 with pivot pins 186 and 188 to an axle 190 carrying a conventional rotatively mounted wheel 192 at one of its ends.

Operation

In the operation of the vehicle suspension 10, the body support levers 20 and 156 are preferably initially alligned with wheel suspension lever 92 in manner such that when that portion of the weight of the body which normally exists on the body support beam 176, while the wheel 192 is at rest on the terrain 194, the pivot pins 168, 178 and 170 will be aligned on a single axis 196 (FIGS. 1 and 3) with the axis 196 and axis 18 forming a plane substantially horizontal with respect to the terrain 194. Such initial adjustment is facilitated by the spline or tooth structure 22 and 24 at each of the ends 14 and 16 of the torsion spring member 12. As the vehicle moves along the terrain 194 and encounters an irregularity such as a bump so as to cause the wheel 192 to suddenly move upwardly as shown by the broken lines 192 in FIG. 3, the axle 190 through links 180 and 182 will cause a corresponding upward and counterclockwise rotary motion (as viewed in FIG. 3) of the wheel suspension lever 92 about the axis 18. Such upward counterclockwise rotary motion of the wheel suspension lever 92 about the axis 18 causes thereby through the positive rotary motion reversing gear systems 86 and 152 an equal and opposite rotary motion of the body support levers 20 and 156. Thus, while the wheel suspension lever 92 moves upwardly, the rotary motion reversing gear systems 86 and 152 retain the pivot pins 168 and 170 of the body support levers 20 and 156 substantially stationary at the axis 196, thereby continuing to support the body on body support beam 176 in an unchanged position relative to the terrain 194 even though the wheel 192 has been moved suddenly upwardly to the position shown by the broken lines 192 in FIG. 3.

This relative rotary motion of the wheel suspension lever 92 and body suspension levers 20 and 156 is due to the forces acting on the torsion spring member 12. When the vehicle is at rest or moving on an absolutely flat and even terrain 194, the vehicle weight load on the lever 20 transmits a clockwise (as viewed in FIG. 3) turning moment or torque about the end 14 of the elongated torsion spring member 12. The reaction or support force from the wheel 192 acting through the pivot pins 186 and 188 and links 180 and 182 respectively, and pivot pin 178 produce through the wheel support lever 92 a turning moment or torque opposite (counterclockwise as viewed in FIG. 3) to that produced by the motor vehicle weight force on the lever 10. However, due to the motion reversing gear system 86, half of this counterclockwise wheel 192 torque is reversed and imparted through the bevel gear 52, rotary motion transmitting tube 40 and the lever 20 to the same end 14 and in the same (clockwise) direction as the torque produced by the above mentioned vehicle weight force on the lever 20.

The other half of the counterclockwise wheel 192 torque is imparted through the rotary motion transmitting tube 90 and yoke 112 to the end 16 of the elongated torsion spring member 12 as a counterclockwise torque as viewed in FIG. 3. To this wheel counterclockwise torque at the end 16 is also added a counterclockwise torque caused by the vehicle weight force on the other body support lever 156 whose effective direction on the end 16 is made counterclockwise by the motion reversing gear system 152. Thus, in this "at rest or level ride condition" the torques about the ends 14 and 16 of the elongated torsion spring member 12 are equal and opposite causing the elongated torsion spring member 12 to be stressed to support the vehicle in an equilibrium condition.

If, now the wheel 192 passed over a bump on the terrain 194, the sudden upward motion of the wheel 192 causes, as explained above, an upward motion of pivot pin 178 (FIG. 3 broken lines) and thereby wheel support lever 92, tending to move the entire suspenison assembly 10 upwardly. This would also cause the body support ends of body support levers 20 and 156 to move upwardly. However, the torque in the elongated torsion spring member 12, which as explained above at its ends 14 and 16 is composed of that produced by the vehicle's weight and the wheel's 192 reaction force, is now increased because the wheel's reaction force is increased by the impact of the bump. As a result, the torsion spring member 12 has induced therein an additional rotational displacement to match this increased torque and the body support levers 20 and 156 which in the previous equilibrium condition had been parallel to the wheel support lever 92, now form with the wheel support lever 92 an angle which retains pivot pins 168 and 170 substantially unmoved from axis 196. Thus the body support beam 176 and thereby the motor vehicle body remains substantially unchanged in its level and even path of travel despite the bump in the terrain 194.

If on the other hand the wheel 192 passes over a hole in the terrain 194, then the process is reversed and results in pulling the suspension assembly 10 downwardly. However, again the resulting reduction in torque in the torsion spring member 12 causes a reduction in relative rotational displacement between ends 14 and 16 which again maintains pivot pins 168 and 170 substantially unmoved from the axis 196. Thus, again the body support beam 176 and thereby the body of the vehicle remains substantially unchanged in its level and even path of travel despite the hole in the terrain 194.

Explaining this phenomenon in terms of energy, in the above described stationary or smooth equilibrium condition, torsional support energy is stored in the torsion spring member 12. When the wheel 192 runs over a bump in the terrain 194, substantially all of the energy imparted to the wheel by the bump is absorbed by the torsion spring member 12 and substantially none is transmitted to the vehicle body. Conversely, when the wheel 192 runs over a hole in the terrain 194, substantially all of the energy released by the wheel due to the hole is supplied by the torsion spring member 12 and substantially none is taken from the vehicle body.

Due to the inherent equal and opposite torques at ends 14 and 16 of the torsion spring member 12, the spring member 12 will not rotate in the suspenison assembly 10 and the ends 14 and 16 will always twist in equal displacement amounts in opposite directions about the axis 18. The angle of twist or rotary displacement will depend on the vehicle's load on level terrain 194 and will increase when the wheel 192 passes over a bump on the terrain 194 and decreases when the wheel 192 drops into a depression in the terrain 194. In the case of a bump, the additionally stored energy in the torsion spring member 12 is again released by the torsion spring member 12 when the wheel 192, after having passed the peak of the bump, again returns to the even terrain 194. In the case of a depression in the terrain 194, the released energy of the torsion spring member 12 is replenished when the wheel again rises to the level of the terrain. The torsion spring member 12 comes into play only when there are sudden changes in the traveled profile of the terrain 194. Slow changes as those occuring when the vehicle follows gradual changes in terrain elevation do not affect the torsion spring member 12. The torsion spring member 12 comes into play under dynamic load conditions and is somewhat comparable to an electrical circuit containing an inductor. If the inductor has a large inductance and a small resistance, then it substantially blocks alternating currents, but passes direct current with very little loss. The alternating current in this instance being comparable to rough terrain 194 and direct current to smooth terrain 194.

This invention is not limited to the particular details of construction and operation described, as equivalents will suggest themselves to those skilled in the art.

What is claimed is:

1. In a vehicle suspension, the combination of a rigid hollow tube having a longitudinal axis, an elongated torsion spring member in the hollow of said tube and having two ends and a longitudinal axis coincident with said tube axis, a pair of rotary motion transmitting tubes mounted on said rigid tube to rotate about said tube axis, a motion reversing gear train fixed to said rotary motion transmitting tubes to cause said rotary motion transmitting tubes to rotate in opposite directions about said axis, a first lever coupled to one end of said torsion spring member and one of said rotary motion transmitting tubes for integral rotation therewith and adapted for support coupling to a vehicle body structure, a second lever coupled to the other end of said torsion spring member and the other of said rotary motion transmitting tubes for integral rotation therewith and adapted for support coupling to a vehicle wheel, a third lever and a second motion reversing gear train with the third lever being mounted on said other rotary motion transmitting tube to rotate about said axis and adapted for coupling to said body support structure, said second motion reversing gear train being coupled to said third lever and said other rotary motion transmitting tube for causing said third lever to rotate in opposite direction to said second lever.

2. In a vehicle suspension, the combination of a rigid hollow tube having a longitudinal axis; an elongated torsion spring member in the hollow of said tube and having two ends and a longitudinal axis coincident with said tube axis; a pair of rotary motion transmitting tubes mounted on said rigid tube to rotate about said tube axis; a motion reversing gear train fixed to said rotary motion transmitting tubes to cause said rotary motion transmitting tubes to rotate in opposite directions about said axis, said motion reversing gear train including a first bevel gear rigidly fixed to one of said rotary motion transmitting tubes for integral rotation with said one rotary motion transmitting tube about said axis, a second bevel gear rigidly fixed to the other of said rotary motion transmitting tubes for integral rotation with said other rotary motion transmitting tube about said axis, a pinion having a rotational axis perpendicular to said tube axis and in mesh with said first and second bevel gears, means rigidly fixed to said rigid hollow tube mounting said pinion for rotation about its rotational axis with said rotational axis remaining fixed with respect to said rigid tube; a first lever coupled to one end of said torsion spring member and said one rotary motion transmitting tube for integral rotation therewith and adapted for support coupling to a vehicle body structure; and a second lever coupled to the other end of said torsion spring member and said other rotary motion transmitting tube for integral rotation therewith and adapted for support coupling to a vehicle wheel.

3. In a vehicle suspension for a vehicle body structure and a wheel, the combination of a rigid hollow tube having a longitudinal axis, an elongated torsion spring member in the hollow of said tube and having two ends and a longitudinal axis coincident with said tube axis, a pair of rotary motion transmitting tubes mounted on said rigid tube to rotate about said rigid tube axis, a first bevel gear fixed to one rotary motion transmitting tube for integral rotation with said one rotary motion transmitting tube about said axis, a second bevel gear fixed to said other rotary motion transmitting tube for integral rotation with said other rotary motion transmitting tube about said axis, a pinion having a rotational axis substantially perpendicular to said tube axis and in mesh with said first and second bevel gears, means fixed to said rigid hollow tube mounting said pinion for rotation about its rotational axis with said rotational axis remaining fixed with respect to said rigid tube, a first lever coupled to one end of said torsion spring member and said one rotary motion transmitting tube for integral rotation therewith about said tube axis and adapted for support coupling to said vehicle body structure, a second lever distal from said first lever coupled to the other end of said torsion spring member and the other of said rotary motion transmitting tubes for integral rotation therewith about said tube axis and adapted for support coupling to said wheel, a third lever distal from said second lever by the same amount as said first lever and in opposed relation to said first lever mounted on said other rotary motion transmitting tube for relative rotation with respect to said other rotary motion transmitting tube about said tube axis and adapted for support coupling to said vehicle body structure, a third bevel gear fixed to said third lever for integral rotation with said third lever about said tube axis, a fourth bevel gear coupled to said other end of said torsion spring member for integral rotation with said other torsion spring member end about said tube axis, a second pinion having a rotational axis perpendicular to said tube axis and in mesh with said third and fourth bevel gears, and means fixed to said rigid hollow tube mounting said second pinion for rotation about its rotational axis with said axis remaining fixed with respect to said rigid tube.

References Cited by the Examiner

UNITED STATES PATENTS

| | | | |
|---|---|---|---|
| 2,330,482 | 9/1943 | Fageol | 280—124.3 X |
| 2,333,650 | 11/1943 | Hickman | 280—124.3 X |

BENJAMIN HERSH, *Primary Examiner.*

P. GOODMAN, *Assistant Examiner.*